G. OSBERG.
TOOL HOLDER.
APPLICATION FILED DEC. 9, 1919.

1,407,764.

Patented Feb. 28, 1922.

Inventor.
Gustaf Osberg
by Heard Smith & Tennant.
Attys.

UNITED STATES PATENT OFFICE.

GUSTAF OSBERG, OF BOSTON, MASSACHUSETTS.

TOOL HOLDER.

1,407,764.

Specification of Letters Patent.  Patented Feb. 28, 1922.

Application filed December 9, 1919. Serial No. 343,600.

*To all whom it may concern:*

Be it known that I, GUSTAF OSBERG, a citizen of the United States, residing at Boston, county of Suffolk, State of Massachusetts, have invented an Improvement in Tool Holders, of which the following description, in connection with the accompanying drawing, is a specification, like characters on the drawing representing like parts.

This invention relates to tool holders of that type which are constructed to yieldingly support the tool.

In machine shop practice it is of advantage under some circumstances to provide a yielding support for certain tools, such, for instance, as a threading tool or a cutting-off tool. Under other conditions it is equally desirous and necessary that the tool should be rigidly instead of yieldingly supported.

The main object of the invention is to provide a tool holder which is constructed so that the tool may be either yieldingly or rigidly supported, depending on the character of the work to be performed.

In order to give an understanding of my invention, I have illustrated in the drawings a selected embodiment thereof which will now be described, after which the novel features will be pointed out in the appended claims.

My improved tool holder comprises a body portion having a shank to be sustained by the tool post, a tool-holding member pivotally connected to the shank, one or more springs arranged to form a yielding backing for the tool-holding member, and adjustable means by which the tool-holding member can be clamped rigidly to the body thereby to form a rigid support for the tool, or may be allowed to have a yielding motion relative to the body in case it is desired to support the tool yieldingly.

Figure 2:
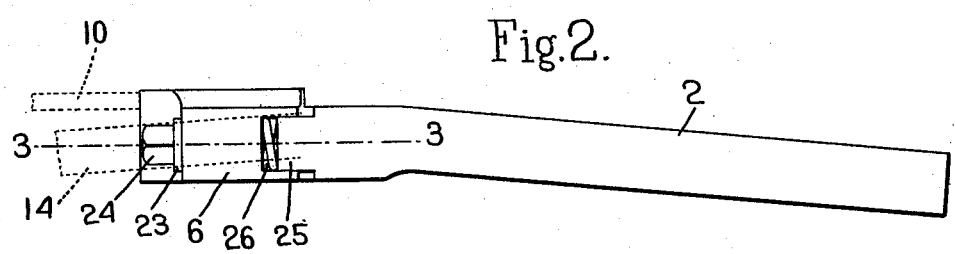
Fig. 2 is a bottom plan view.

The body of my improved tool holder is indicated generally at 1, and it comprises the shank 2 adapted to be supported in the ordinary tool post of a lathe or other machine, and the head portion 3. This head portion 3 has a face 4 and is provided with the forwardly-extending arm 5 to which the tool-holding member is pivoted. The tool-holding member is shown generally at 6 and it is forked at its upper end to embrace the arm 5 and is pivoted to said arm by means of a pivot pin 7. This tool-holding member is preferably constructed to support tools of various kinds. It is shown as provided on one face with a fixed clamping shoulder 8 and an adjustable clamping shoulder 9 between which a tool 10 may be clamped. The adjustable clamping shoulder 9 is formed on a clamping block 11 which is clamped to the body of the tool holder by means of a clamping screw 12. These clamping shoulders are arranged at the side of the tool-holding member so that the tool 10 will be supported at the side, as indicated in Fig. 2.

The tool-holding member is also formed with a socket 13 in which another tool indicated by dotted lines 14 may be received, said tool being clamped in the socket by means of the clamping screw 12.

Situated between the back face 15 of the tool-holding member and the face 4 of the body are one or more springs adapted to form a yielding backing for the tool-holding member. In the drawings I have shown three such springs indicated at 16, 17 and 18. The spring 18 is received in a spring-receiving socket 19, the spring 17 is received in a spring-receiving socket 20 and the spring 16 is received in another spring-receiving socket 21, all formed in the tool-holding member 6.

22 indicates a clamping screw which extends through the lower end of the tool-holding member and has screw-threaded engagement with the lower end of the body, said screw being provided with a collar 23 which bears against the front face of the tool-holding member and with a wrench-receiving portion 24. In the construction illustrated, this clamping screw is situated to extend through the spring-receiving recess 21 and through the spring 16, but said clamping screw might be situated in any suitable location without departing from the invention. This clamping screw serves not only to limit the yielding movement of the tool-holding member 6 when the device is used as a yielding tool holder, but also serves to clamp said member 6 firmly against the body when it is desired to give a rigid unyielding support to the tool.

Figure 1:
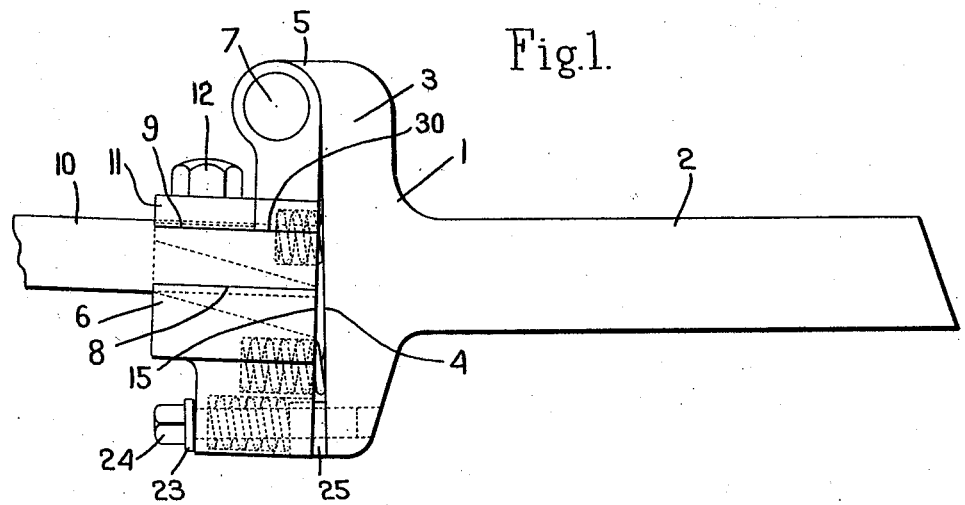
Fig. 1 is a side view of a tool holder embodying my invention.

In Fig. 1 the screw is shown as adjusted so as to allow the tool-holding member to have a yielding movement and when adjusted in this way the resiliency of the springs 16, 17, 18 normally holds the tool-holding member slightly separated from the body. These springs are preferably of sufficient strength to maintain the tool-holding member in its forward position shown in Fig. 1 during the operation of the tool on the work, but if for any reason the tool should catch in the work or meet an abnormal resistance, the springs will yield to allow the tool-holding member to give thereby preventing the tool from becoming broken. If desired, I may use springs of different tension or strength in the different recesses. These springs can be readily removed by first removing entirely the clamping screw 22 and then swinging the tool-holding member outwardly, and it is possible, therefore, to use one or more of the springs depending upon the strength of the yielding support which it is desirable to give to the tool-holding member.

Figure 3:
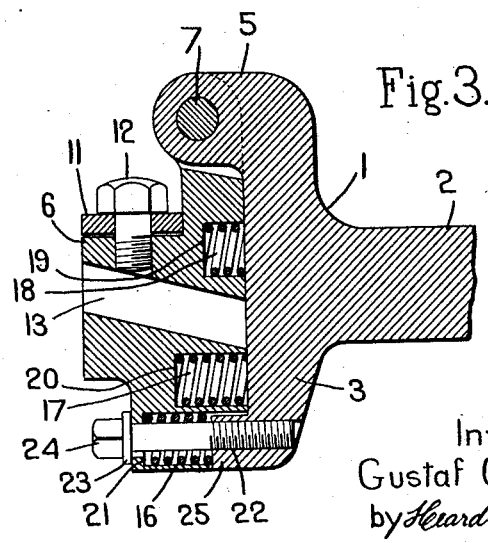
Fig. 3 is a section on the line 3—3, Fig. 2.

If it is desired to have a rigidly-supported tool, then the clamping screw 22 will be adjusted so as to clamp the face 15 of the tool-holding member firmly against the face 4 of the body, as shown in Fig. 3, and under these conditions, the tool-holding member is rigid with the body and a rigid support is thus provided for the tool. With my invention, therefore, it is possible to provide either a yielding support or a rigid support for the tool as circumstances require.

The lower end of the body 3 is shown as provided with a projection 25 which enters a recess 26 formed in the lower portion of the tool-holding member 6. This projection 25 and recess 26 serve to prevent any lateral movement of the tool-holding member relative to the body.

It will be noted that the arm 5 to which the tool-holding member is pivoted extends forwardly so that said member is suspended from the arm. By this construction the pivotal point of the tool-holding member is situated in front of the rear face thereof and above the tool. I find that this is an advantageous arrangement.

I have above referred to the fixed clamping shoulder 8 and the adjustable clamping shoulder 9 between which the tool 10 is clamped. I will preferably make the tool-holding member with a fixed shoulder 30 in the rear of the shoulder 9 and against which the tool rests, so that when the tool is in use, the strain of the tool will be partly taken by the fixed shoulder 30 and partly by the clamping block 11.

While I have illustrated a selected embodiment of my invention, I do not wish to be limited to the constructional features shown.

I claim:

1. In a tool holder, the combination with a body portion having a shank to be sustained in the tool post, of a tool-holding member pivoted to said body portion, a spring interposed between said tool-holding member and body portion and providing a yielding backing for said member, and adjustable means for limiting the spring-impelled movement of said member, said means being capable of adjustment to maintain said member rigid with the body.

2. In a tool holder, the combination with a body portion having a shank to be sustained in a tool post, of a tool-holding member pivoted at its upper end to the body portion, a spring interposed between said tool-holding member and body portion, and an adjusting screw extending through one of said parts and screwing into the other, said screw being capable of adjustment so as to allow the tool-holding member to have a yielding movement relative to the body or so as to clamp said member firmly against the body.

3. In a tool holder, the combination with a body portion having a shank to be sustained in a tool post and a forwardly-extending arm at its upper end, of a tool-holding member pivoted to said arm and provided with a spring-receiving recess in its rear face, a spring in said recess which tends normally to swing said member away from the body portion, and an adjusting screw extending through said member at its lower end and screw threading into the body portion, said screw being capable of adjustment so as to allow the tool-holding member to have a yielding movement relative to the body or so as to clamp said member firmly against the body.

4. In a tool holder, the combination with a body portion having a shank to be sustained in a tool post and a forwardly-extending arm at its upper end, of a tool-holding member pivoted to said arm and provided with a spring-receiving recess in its rear face, a spring in said recess which tends normally to swing said member away from the body portion, an adjusting screw extending through said member at its lower end and screw threading into the body portion, said body portion having a guiding projection and the tool-holding member having a recess to receive said projection.

In testimony whereof, I have signed my name to this specification.

GUSTAF OSBERG.